United States Patent Office 3,438,935
Patented Apr. 15, 1969

3,438,935
STABILIZED POLYOLEFIN COMPOSITIONS
Kurt W. Leu, Amsterdam, Netherlands, assignor to Shell Oil Company, New York, N.Y., a corporation of Delaware
No Drawing. Filed Dec. 27, 1963, Ser. No. 334,003
Claims priority, application Netherlands, Jan. 31, 1963, 288,392
Int. Cl. C08f 45/60, 3/08
U.S. Cl. 260—45.85    3 Claims

ABSTRACT OF THE DISCLOSURE

Polymers of monoolefins (polypropylene) are stabilized against oxidation when in the presence of copper by incorporating therein an inhibitor combination comprising (1) a hydrozone or a salt thereof and (2) a sterically-hindered phenolic compound.

---

This invention relates to stabilized polymers of alpha-monoolefins. More particularly, it relates to stabilized compositions and to methods of stabilizing polymers of alpha-monoolefins against degradation caused by oxidation promoted by the presence of metals, such as copper.

Isotactic polypropylene is typical of the polymers stabilized according to this invention. It is well known that it is subject to thermal degradation. It was found, however, that most of the conventional stabilizing systems for polyolefins are entirely unsatisfactory in the presence of copper. This problem is discussed in a paper, "Inhibition of the Copper Catalyzed Oxidation of Polypropylene," by R. H. Hansen et al., presented at the St. Louis meeting of the American Chemical Society (Mar. 21–30, 1961), Division of Polymer Chemistry, a summary of which is printed on pp. 190–195 of the preprints. The problem is summarized as follows:

"Isotactic polypropylene is desirable as a dielectric and structural material because of its high softening point, negligible water absorption, relative hardness, toughness, insensitivity toward thermal embrittlement and stress cracking, and its low density and the accompanying excellent insulating properties. However, it has been found that copper, presumably in an oxidized state, catalyzes the thermal oxidation of polypropylene. The reaction occurs so rapidly in the presence of copper, that, even at 1.0% concentrations, thermal antioxidants do not effectively inhibit the degradation. The induction period in oxygen at 140° C. for polypropylene stabilized by the addition of 0.5% by weight of 4,4'-thiobis-(3-methyl-6-tertiary-butylphenol) is decreased from about 400 hours to about 35 hours in the presence of copper. In this case about 99% of the effectiveness of the antioxidant is lost if copper is present. In some antioxidant systems, more than 99% of the antioxidant effectiveness is destroyed by the presence of copper."

The authors solved the problem of copper-catalyzed polypropylene degradation by adding to the polypropylene oxamide or its derivatives.

Oxamide and its derivatives have some drawbacks as additives for polyolefins. Obtaining even distribution in the polymer is difficult since they are not readily soluble in the polymer. The amount needed to provide protection is relatively high. In the desired amounts, oxamide compounds have adverse effects on the electrical properties of the polymers. Nevertheless, oxamide has been considered an essential additive for commercial uses of polypropylene in applications where it is in contact with copper, such as in coating of electrical wiring.

It is known that polyolefins can be stabilized by the addition of sterically-hindered phenols, i.e., phenols wherein secondary or tertiary hydrocarbon radical substituents are present in one or both of the ortho positions with respect to the hydroxy group. Very effective phenols are those described in U.S. Patent 3,026,264 to Rocklin et al. These compounds can be described by generic Formula I, wherein R represents an alkyl group of from 3 to 8 carbon atoms and branched at the alpha position and $R^1$ represents an alkyl group of from 1 to 4 carbon atoms.

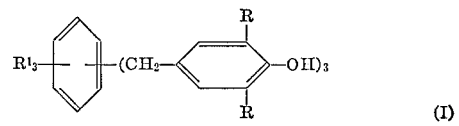

(I)

A preferred phenol is that wherein R is a tertiary-butyl group and $R^1$ is a methyl group.

The stabilizing effect of the above sterically-hindered phenolic compounds is, nevertheless, unsatisfactory if the polypropylene is in contact with copper, e.g., polypropylene material used for purposes of insulating electrical cables. Copper has a catalytic effect on the degradation of polypropylene. It has been found that the degradation period of uninhibited polypropylene in the presence of 1.4% copper dust is decreased by a factor of three over uninhibited polypropylene in the absence of copper. To state it another way, the effect copper has on polypropylene, inhibited against degradation, is to effectively reduce to one-third the concentration of the stabilizer. Thus, to obtain satisfactory stabilization of polypropylene in the presence of copper with a sterically-hindered phenolic compound is described above, the concentration of the phenolic compound must necessarily be increased threefold. Unfortunately, at this higher concentration of the phenolic compound, polypropylene becomes discolored. The discoloration of the polypropylene renders it unsuitable for certain purposes, such as copper wire insulation wherein a color code is to be affixed to the insulation. Also, a clear insulation has more aesthetic appeal and thus, commercial value.

It has now been found that a fully satisfactory stabilization of the polymers, and in particular polypropylene, is obtained when they are in contact with copper, by incorporating with the polymer, in addition to sterically-hindered phenols, hydrazone compounds or salts thereof.

If one desires, a sulfur compound may be incorporated into the composition in addition to the sterically-hindered phenol and hydrazone compound. The addition of the sulfur compound, in some cases, increases the stability of the composition.

The hydrazone compound protects polypropylene against copper-catalyzed thermal oxidation (degradation) in that it forms complexes which appear to tie-up the copper ions. The hydrazone, thus increases the effectiveness of the inhibitors.

It has been found that at temperatures of the order of 300° C., the hydrazones recrystallize to form larger crystals. The recrystallization reduces the stabilizing effect of the composition. This undesirable phenomena can be obviated by employing the hydrazones wholly or partially in the form of their metal salts.

Accordingly, this invention is directed toward polyalphaolefin compositions of substantially superior stability against degradation in the presence of copper.

POLYMERS

The polymers which can be stabilized according to this invention are normally solid plastic polymers of alpha-monoolefins which can be prepared at low temperatures and pressures in the presence of certain catalyst compositions which are commonly referred to as "Ziegler-type" catalysts, "low pressure catalysts," or "coordination catalysts."

Polymers produced by use of such catalysts are characterized by a high degree of regularity of their molecules and are termed isotactic, stereoregular, crystallizable, crystalline, linear, low pressure, or "Ziegler" polymers.

A particularly useful low-pressure polymer is highly crystalline or crystallizable polypropylene. It is characterized, among other things, by a high melting point, i.e., in the order of about 170° C. and improved tensile strength. Although there are various ways of distinguishing this polypropylene from the prior art amorphous type of polypropylene, it is convenient to characterize the crystalline polymer by the proportion of polymer which is insoluble in heptane, amorphous polypropylene being soluble therein. Low-pressure polypropylene prepared with preferred Ziegler type catalysts contains as much as 90 to 98% heptane insoluble polymer.

The inhibitor systems of this invention are useful in linear polymers of olefins of from 2 to 8 carbon atoms per molecule, including ethylene, butene-1, 4-methyl-pentene-1 and hexene-1 and in crystalline copolymers of propylene with ethylene, butene-1 and the like and block copolymers of alpha-olefins. While this invention thus applies to polymers of various alpha-monoolefins, the description is directed mainly to polypropylene. It has been found that polypropylene is particularly readily attached and degraded in the presence of copper. Also, inhibitor systems which are satisfactory under other conditions and in some of the polyolefins, e.g., polyethylene, are often unsatisfactory in polypropylene and are generally unsatisfactory in the presence of copper. On the other hand, inhibitor systems satisfactory in polypropylene in the presence of copper will usually also be satisfactory in other low-pressure polymers, even under similar conditions, such as in the presence of copper. The invention will therefore be explained by reference to stabilization of polypropylene.

Reactants, catalysts, and conditions useful in the production of Ziegler type low-pressure polyolefins are known in prior art. Early references are, for example, Belgian Patents Nos. 534,792 and 538,782 to Ziegler and Ziegler et al., respectively. A great variety of suitable catalysts and conditions for their use have since been described. Suitable catalysts can be selected from the references listed on pp. 350–361 of "Linear and Stereoregular Addition Polymers," by Gaylord and Mark, Interscience Publishers, Inc., New York, 1959. Catalysts which are particularly suitable for production of highly crystalline polypropylene, and their use, are described in U.S. Patent 2,971,925 to Winkler et al.

In general, suitable coordination catalysts comprise the reaction product of (1) a compound of a transition metal selected from the metals in sub-groups "a" of Groups IV, V and VI and from Group VIII metals of the Mendeleev Periodic Table as illustrated on p. 28 of Ephraim, "Inorganic Chemistry," 6th English ed., with a reducing compound which is generally a hydride or a metal-organic compound of a metal from Groups I–III of the Periodic Table.

The preferred transition metals whose compounds are used for producing various types of low-pressure polymers are titanium, vanadium and chromium. Titanium trichloride is a particularly preferred compound. Other suitable metals include zirconium, hafnium, tellurium, columbium, tantalum, molybdenum, cobalt, and nickel. The preferred reducing compounds are aluminum alkyls, particularly aluminum trialkyls and dialkyl aluminum halides. Lower alkyl groups, such as ethyl, isopropoyl and isobutyl are preferred. The preferred halogen element is chlorine.

PHENOLS

The sterically-hindered phenols which are useful in this invention are of the general formula

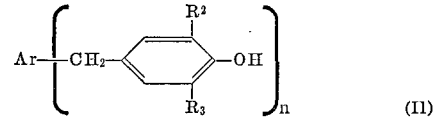

(II)

wherein Ar represents an aryl nucleus which has attached thereto substituent groups selected from hydrocarbon radicals, hydroxy groups, halide atoms and hydrogen atoms. The hydrocarbon radicals include aliphatic, cycloaliphatic, aromatic and aliphatic-aromatic radicals and may be saturated or unsaturated. $R^2$ is a member selected from secondary and tertiary hydrocarbon radicals, $R^3$ is a member selected from a hydrogen atom and secondary and tertiary hydrocarbon radicals and $n$ is a positive integer, preferably from 1 to 3. Preferably $R^2$ and $R^3$ are alkyl groups containing from 3 to 8 carbon atoms.

Particularly desirable phenolic compounds are those of the formula

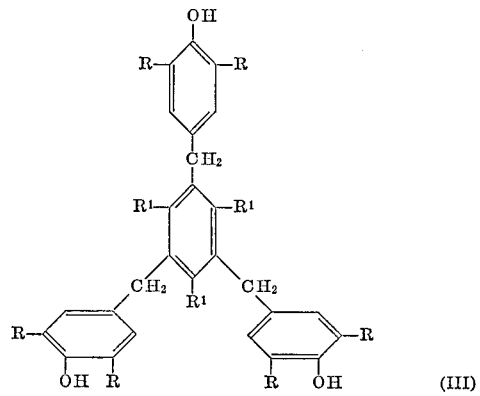

(III)

wherein R and $R^1$ are as previously defined. The preferred and most effective phenol is that corresponding to Formula III when R is tertbutyl and R' is methyl. As illustrated by the example to follow, the protection afforded to polypropylene in contact with copper is surprisingly high when this latter phenol is used in the polypropylene composition as compared to other similar phenolic compounds.

Other suitable phenols are those of the formula

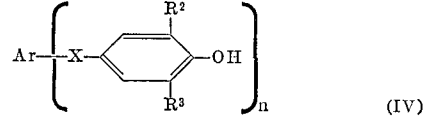

(IV)

wherein Ar, $R^2$, $R^3$ and $n$ are as previously defined and X is a member selected from

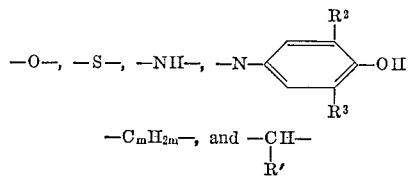

in which $m$ is at least 2 and R' is as previously defined.

The substituents of the above phenols which give rise to the steric hindrance are, for instance, isopropyl, tertiary butyl, tertiary pentyl, cyclohexyl, norbornyl and isobornyl. The preferred species of the sterically-hindered phenols, 1,3,5 - trimethyl - 2,4,6 - tris(3,5 - di - tertiary butyl - 4 - hydroxybenzyl)benzene, is known and described in U.S. Patent No. 3,026,264 to Rocklin et al.

Representative of other suitable phenols are the following: 1,3,5 - triethyl - 2,4,6 - tris(3,5 - di - isopropyl - 4 - hydroxybenzyl)benzene; 1,3,5 - trimethyl - 2,4 - di(3,5 - di - cyclohexyl - 4 - hydroxybenzyl)benzene; 1,3,5 - trimethyl - 2,4,6 - tris(3,5 - di - norbornyl - 4 - hydroxybenzyl)benzene; 1,2,4 - trimethyl - 3,5,6 - tris(3 - methyl - 5 - isopropyl - 4 - hydroxybenzyl)benzene; 1,2 - dimethyl - 5 - ethyl - 3,4,6 - tris(3 - amyl - 5 - tert - butyl - 4 - hydroxybenzyl)benzene; and 1,3,5 - trimethyl - 2,4,6 - tris (3-ethyl-5-isopropyl-4-hydroxybenzyl)benzene.

HYDRAZONES

The hydrazones of this invention are generically represented by the formula

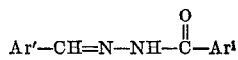

(IV)

wherein Ar¹ represents

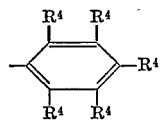

wherein $R^4$ is a member selected from hydrocarbon radicals, a hydroxy group, a halide atom and a hydrogen atom with the proviso that at least one $R^4$ of the hydrazone is a hydroxy group and preferably attached to the ring in the ortho position, i.e.,

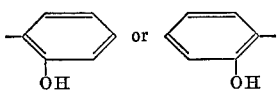

The hydrocarbon radicals include aliphatic, cycloaliphatic, aromatic and aliphatic-aromatic radicals and may be saturated or unsaturated. Examples of suitable hydrocarbon radicals are those having up to 10 carbon atoms, such as methyl, ethyl, propyl, isopropyl, butyl, tert-butyl, norbornyl, isobronyl, cyclohexyl, vinyl, phenyl, benzyl, tolyl and the like. Ar and A¹ may also be condensed nucleim such as naphthyl.

Representative hydrazones of Formula IV are the following: 2 - methylbenzaldehyde 4 - methylsalicyloylhydrazone; 2 - chloro - 4 - methylbenzaldehyde 6 - ethylsalicyloylhydrazone; 2 - ethyl - 4 - hydroxybenzaldehyde 6 - ethylsalicyloylhydrazone; 2 - hydroxy - 4 - butylbenzaldehyde 4,5 - dimethylsalicyloylhydrazone; 2,6 - diethyl - 4 - chlorobenzaldehyde 4 - vinylsalicyloylhydrazone; 2 - hydroxy - 4,6 - dimethylbenzaldehyde 6 - hydroxysalicyloylhydrazone; 3 - hydroxybenzaldehyde salicyloylhydrazone; 4 - hydroxybenzaldehyde salicyloylhydrazone; 2-methyl - 4 - hydroxybenzaldehyde salicyloylhydrazone and the like.

The preferred hydrazone for use in the compositions of this invention is hydroxybenzaldehyde salicyloylhydrazone of the formula

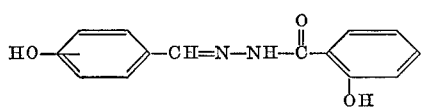

(V)

The hydrazones are known and some are commercially available.

A typical preparation of a hydrazone is described, for example, in Analytical Chemistry, vol. 31, pp. 296 to 298 (1959).

SALTS OF HYDRAZONES

When compositions incorporating the above defined hydrazones are used at temperatures of about 300° C., the hydrazone may recrystallize to form larger crystals, and thereby reduces the stabilizing effect thereof. This possible recrystallization can be obviated by employing the above defined hydrazones wholly or partially in the form of their metal salts. The salts, therefore, are of the general formula as the corresponding hydrazone except that one or more of the hydroxy groups of the hydrazone has the hydrogen atom thereof replaced by a metal atom. The metal atom is preferably an alkali metal, such as sodium or potassium, or an alkaline earth metal, such as calcium or barium.

The hydrazone salts are prepared by addition to the hydrazone of one equivalent of an alcoholic metal hydroxide solution to form the corresponding metal salt of the hydrazone. The mole ratio of the hydrazone and metal hydroxide may be varied depending upon the amount of salt desired.

A preferred hydrazone salt for use in the invention is that of the formula

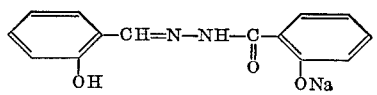

(VI)

SINGLE COMPOUND COMBINING FUNCTIONS OF PHENOL AND HYDRAZONE

A modification of the invention consists of selecting a hydrazone or salt thereof so that it functions both as a hydrazone and a sterically-hindered phenol. Then, if so desired, only this compound need be added to the polymer. The selected hydrazone must have hydroxy or OM groups in the aryl nuclei (Ar and Ar¹) such that the groups occur in an ortho position with respect to alkyl groups branched at the alpha position or cycloalkyl groups, for example, the compound

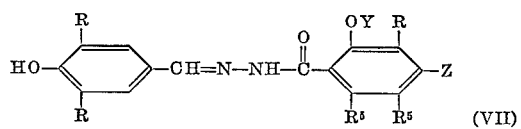

(VII)

wherein R is as previously defined, $R^5$ is a member selected from a hydrogen atom and R, Y is a member selected from a metal atom preferably an alkali metal, and a hydrogen atom and Z is a member selected from a hydroxyl group, and a hydrogen atom, with the proviso that when Z is a hydroxyl then $R^5$, attached ortho to Z, is R. The quantity of this compound incorporated with the polymer may vary from 0.01 to 5.00% and preferably from 0.05 to 0.50% by weight with reference to the polymer.

SULFUR COMPOUNDS

The stability of the compositions of this invention may be further increased by incorporating in the compositions, compounds of the formula

(VIII)

wherein $R^6$ is a hydrocarbon radical, preferably alkyl groups of from 8 to 25 carbon atoms or hydroxy-substituted alkyl groups, and p is an integer of not more than 2. Such an effect can also be accomplished by compounds of the formula

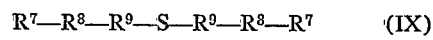

(IX)

wherein $R^7$ is either a hydrocarbon radical, preferably alkyl, or a hydrogen atom, $R^8$ is a carbonyl group, i.e., $CO_2=$, and $R^9$ is a hydrocarbon radical, preferably alkylene. It is apparent that the oxy atom of the carboxyloxy group may be attached to either $R^7$ or $R^9$ and further that $R^7$ and $R^9$ may be similar or dissimilar radicals. Particularly preferred are dialkyl esters or thiodipropionic acid, wherein the alkyl group has from 12 to 20 carbon atoms.

Examples of compounds of Formula VIII are dicetyl sulfide, cetyl dodecyl sulfide, didodecyl sulfide, dieicosyl sulfide, di-n-dodecyl disulfide, thiuram disulfide, tetraethyl thiuram disulfide, bis(omega hydroxycetyl)monosulfide, bis(beta,gamma - dihydroxylauryl)monosulfide, bis(delta - hydroxydodecyl)monosulfide. Examples of compounds of Formula IX are dilauryl thiodipropionate (dilauryl ester of thiodipropinsic acid $S(C_2H_4COOH)_2$, distearyl thiodipropionate, mono- and didodecanoic esters of thiodiglycol, esters of aliphatic monocarboxylic acids with from 8 to 30 carbon atoms and the following sulfides: bis(gamma - hydroxypropyl)monosulfide; bis(beta,gamma-dihydroxypropyl(monosulfide; bis(delta-hydroxybutyl)monosulfide; bis(delta,gamma-dihydroxy-monosulfide; and bis(beta,gamma - dihydroxypropyl) monosulfide. The aliphatic monocarboxylic acids may be unbranched, branched, cyclic or acyclic; branching at the alpha or beta position is recommended. Representative of the aliphatic monocarboxylic acids are capric, aluric, alpha-methyllauric, myristic, oleic, linoleic, eleostearic, margaric, arachidic, behenic, cyclopentyl propionic and the like.

The composition consists of from about 0.05% to 5% of the hydrazone and preferably from 0.2% to 1% and from about 0.01% to 1% of the phenol and preferably from 0.05% to 5%. The sulfur compound when added to the composition varies from about 0.05% to 5% and preferably from 0.05% to 0.5%. The percent represents weight percent with reference to the polymer to be stabilized.

The stabilizers used in accordance with this invention may be admixed with the polyolefin by any of the usual procedures for incorporating an antioxidant uniformly in a solid material to form a homogeneous composition. A simple method is to dissolve the antioxidant in a low-boiling solvent such as acetone or hexane, etc., and then after mixing the stabilizer solution with the polymer in flake or other such form, evaporating the solvent to obtain a homogeneous blend. Another method is to incorporate the antioxidants by various means of mechanical mixing, etc., as for example, dry mixing to form a homogeneous blend and then extruding into molding, powder, fiber, film, etc.

The stabilizers of this invention may be used in combination with other stabilizers such as ultraviolet light absorbers, antiacids such as calcium soaps or other antioxidants. Other materials may also be incorporated in the polymer as, for example pigments, dyes, fillers, etc.

EXAMPLE

Experiments were carried out with a polypropene that had been prepared with the aid of a catalyst system composed of titanium trichloride and aluminum diethyl chloride and having an intrinsic viscosity of 3.4 determined at 135° C. in decahydronaphthalene.

The polymer powder was mixed with the stabilizer and milled for 5 minutes at 180° C. From the sheet obtained by milling, slices of ½ mm. thickness were pressed at 230° C. Then, at 210° C. sandwiches were pressed, consisting of two slices of the polymer composition with a layer of copper gauze between them. The sandwiches were kept at 135° C. in a drying oven, exposed to the atmosphere. The table below gives the number of days, called the oven life, at the end of which the composition was found to be brittle.

The stabilizers used:

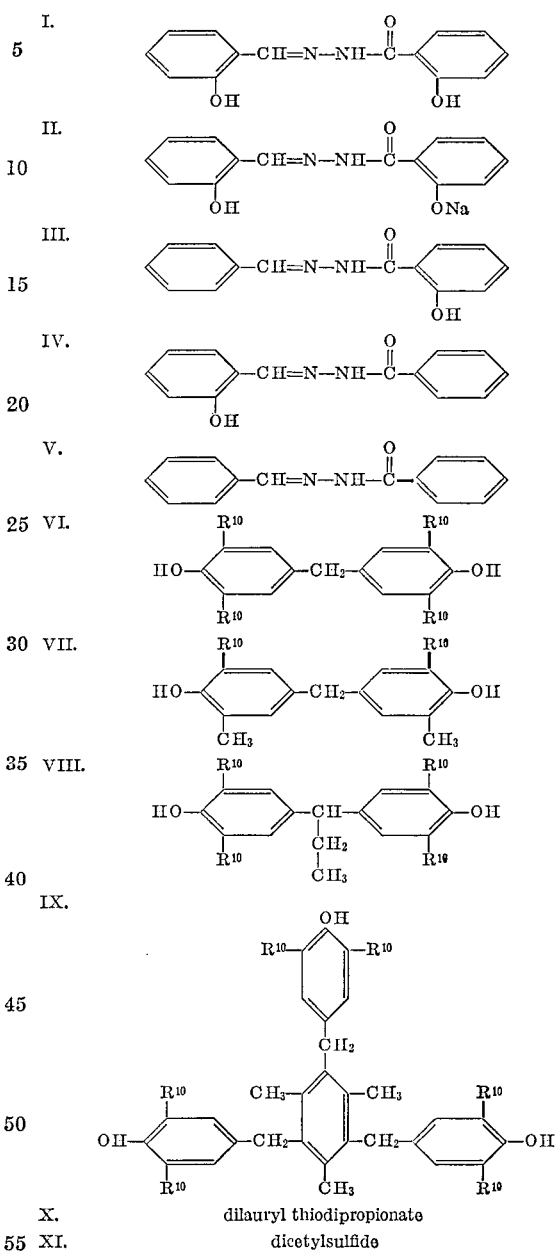

X. dilauryl thiodipropionate
XI. dicetylsulfide

| Sample No. | Stabilizers | Quantity, percent by wt. | Oven life, days | Oven life, days without copper present |
|---|---|---|---|---|
| 1 | I | 0.5 | 5 | |
| 2 | II | 0.5 | 5 | 5 |
| 3 | VI | 0.1 | 3 | |
| 4 | VI | 0.1 | 3 | |
| 5 | VIII | 0.1 | 3 | |
| 6 | IX | 0.1 | 1-2 | |
| 7 | X | 0.3 | 1-2 | |
| 8 | I+IX | 0.5+0.1 | 126 | |
| 9 | I+VI | 0.5+0.1 | 20 | |
| 10 | I+VII | 0.5+0.1 | 18 | |
| 11 | I+VIII | 0.5+0.1 | 13 | |
| 12 | II+IX | 0.5+0.1 | 73 | 105 |
| 13 | II+X | 0.5+0.3 | 38 | 55 |
| 14 | II+XI | 0.5+0.3 | 35 | 55 |
| 15 | III+IX | 0.5+0.3 | 11 | |
| 16 | IV+IX | 0.5+0.3 | 40 | |
| 17 | V+IX | 0.5+0.3 | 2 | |

Similar results are obtained when a polymer of ethylene, butene-1, 4-methyl-pentene-1, hexene-1, or a crystalline copolymer of propylene with ethylene is substituted for polypropylene in Examples 1 to 6. Also, similar results are obtained when any of the following hydrazones or their sodium salt is substituted for the hydrazone of Examples 1, 2, 5 and 6: 2-hydroxy-4,6-dimethylbenzaldehyde 2-hydroxysalicyloylhydrazone; 2-methyl-4-hydroxybenzaldehyde salicyloylhydrazone; 4-hydroxybenzaldehyde salicyloylhydrazone. Further, similar results are also obtained when 1,3,5-trimethyl-2,4,6-tris(3,5-di-isopropyl-4-hydroxybenzyl)benzene or 1,3,5-trimethyl-2,4,6-tris(3,5-di-cyclohexyl-4-hydroxybenzyl)benzene are used in place of the phenol in Examples 3, 5 and 6.

I claim as my invention:

1. A polyolefin composition stabilized against degradation at high temperatures when in contact with copper comprising:
   (I) polypropylene combined with
   (II) a combination of inhibitors consisting of
     (1) from about 0.01% to 1% by weight of the polypropylene of at least one compound of the formula

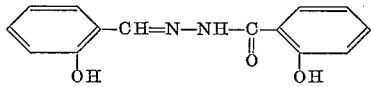

wherein at least one of the hydroxyl groups has the hydrogen atom thereof replaced by a metal atom selected from the group consisting of alkali and alkaline earth metals, and
     (2) from about 0.05% to 5% by weight of the polypropylene of 1,3,5-trimethyl-2,4,6-tris(3,5-di-tertiary-butyl-4-hydroxybenzyl)benzene.

2. A composition according to claim 1 wherein component (II) comprises 0.1% by weight of 1,3,5-trimethyl-2,4,6 - tris(3,5-di-tertiary-butyl-4-hydroxybenzyl)benzene and 0.5% by weight of

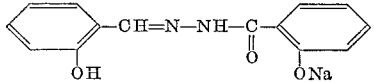

3. A composition according to claim 1 wherein from 0.05 to 5% by weight based on the polymer of a compound selected from the group consisting of dilauryl thiodipropionate and dicetyl sulfide is additionally employed.

References Cited

UNITED STATES PATENTS 3,110,696 11/1963 Dexter _____ 260—45.9
3,190,852 6/1965 Doyle _____ 260—45.95

DONALD E. CZAJA, Primary Examiner.

HOSEA E. TAYLOR, Assistant Examiner.

U.S. Cl. X.R.

260—45.7, 45.75, 45.9, 23, 45.95, 41; 252—403, 404, 405, 406; 117—132; 252—407